(12) United States Patent
Singh

(10) Patent No.: US 9,741,224 B1
(45) Date of Patent: Aug. 22, 2017

(54) ALARMING PARENTS FOR STOPPING CHILDREN BEING LEFT IN A VEHICLE BY MISTAKE

(71) Applicant: Sanjeev Kumar Singh, Alpharetta, GA (US)

(72) Inventor: Sanjeev Kumar Singh, Alpharetta, GA (US)

( * ) Notice: Subject to any disclaimer, the term of this patent is extended or adjusted under 35 U.S.C. 154(b) by 0 days.

(21) Appl. No.: 15/238,100

(22) Filed: Aug. 16, 2016

Related U.S. Application Data

(60) Provisional application No. 62/372,187, filed on Aug. 8, 2016.

(51) Int. Cl.
| | |
|---|---|
| G08B 21/02 | (2006.01) |
| H04W 4/00 | (2009.01) |
| H04W 4/14 | (2009.01) |
| H04B 1/3816 | (2015.01) |
| G08B 3/10 | (2006.01) |
| G08B 5/22 | (2006.01) |
| B60Q 9/00 | (2006.01) |

(52) U.S. Cl.
CPC ........... *G08B 21/0202* (2013.01); *B60Q 9/00* (2013.01); *G08B 3/1025* (2013.01); *G08B 5/224* (2013.01); *H04B 1/3816* (2013.01); *H04W 4/008* (2013.01); *H04W 4/14* (2013.01)

(58) Field of Classification Search
CPC ........ B60N 2/002; B60N 2/26; B60N 2/2812; B60N 2/2806; G08B 21/22; G08B 21/0202; B60Q 9/00
See application file for complete search history.

(56) References Cited

U.S. PATENT DOCUMENTS

| | | | | |
|---|---|---|---|---|
| 9,384,647 B1* | 7/2016 | Arnold | ............... | G08B 21/02 |
| 2015/0279195 A1* | 10/2015 | Qian | ............... | G08B 21/24 |
| | | | | 340/540 |
| 2015/0325124 A1* | 11/2015 | Fernback | ............... | G08G 1/092 |
| | | | | 340/905 |

* cited by examiner

*Primary Examiner* — Curtis Odom
(74) *Attorney, Agent, or Firm* — Sanjeev K. Singh

(57) ABSTRACT

Reminder mechanisms for driver handheld mobile devices are provided to provide an alarm to prevent children being left in a vehicle by mistake by a child caregiver for stopping hot vehicle deaths of children due to heat strokes. A wireless in-vehicle reminder device system comprises a wireless in-vehicle reminder device having a housing including a plug to snugly insert into a socket or a port of a vehicle to connect to a power source of the vehicle. The wireless in-vehicle reminder device includes a first wireless transceiver configured to communicate on a first wireless link with a first wireless module of a handheld mobile device and a reminder mechanism configured to provide a reminder in a form of an alarm signal to the handheld mobile device over the first wireless link in response to a warning event detected in the vehicle. The wireless in-vehicle reminder device system further comprises a reminder application (APP) installed on the handheld mobile device and associated with the reminder mechanism to provide at least one of an audio warning and a visual warning from the handheld mobile device in response to the alarm signal.

10 Claims, 5 Drawing Sheets

ALARMING PARENTS FOR STOPPING CHILDREN BEING LEFT IN A VEHICLE BY MISTAKE

CROSS REFERENCE TO RELATED APPLICATIONS

This application claims the priority benefit of the U.S. Provisional Application Ser. No. 62/372,187 entitled "ALARMING PARENTS FOR STOPPING CHILDREN BEING LEFT IN A VEHICLE BY MISTAKE," filed on Aug. 8, 2016, the contents of which are hereby incorporated by reference herein in their entirety.

BACKGROUND

1. Field

Aspects of the present invention relates reminding drivers who might forget that a child is in the vehicle, and more particularly, to providing an alarm to prevent children being left in a vehicle by mistake by a child caregiver for stopping hot vehicle deaths of children due to heat strokes.

2. Description of the Related Art

On average, 37 children die from heat-related deaths after being trapped inside hot vehicles. Even the best of parents or caregivers can unknowingly leave a sleeping baby in a car; and the end result can be injury or even death. Often, a parent has forgotten to drop a child off at daycare.

An infant car seat with technology designed to remind drivers of their backseat passengers, and stop children from dying in hot cars is now available. A sensor on the infant seat harness triggers a series of tones if a child is still buckled in when the ignition is switched off. The feature is meant to remind drivers who might forget that a child is in the vehicle. It has a wireless receiver that plugs into a car's on-board diagnostic port and syncs with the chest clip that goes around the baby. It does not require the use of Bluetooth, cellular or other devices. It's the first and only crash-tested car seat that has this type of technology embedded.

Right now (on the market) it's more attachments or accessories or mobile apps, but there's not one that's an actual car seat that has this technology. Hundreds of products invented by well-meaning people to prevent children from dying in a hot car, and the new infant car seat is the most promising development so far. However, the parents have to buy this specific car seat only and cannot use their own existing car seats.

Therefore, there is a need for improvements in reminding drivers of their backseat passengers and stop children from dying in hot vehicles.

SUMMARY

Briefly described, aspects of the present invention relate to reminder mechanisms which provide an alarm to a driver of a vehicle for not unknowingly leaving a sleeping baby in a vehicle where the end result can be an injury or even death of the child in a hot vehicle due to a heat stroke. In particular, a reminder mechanism is built in a pluggable cellular device having a subscriber identity module or subscriber identification module (SIM) card, a motion sensor, a voice sensor and an on-board battery for providing an alarm signal to an associated reminder application (APP) installed on a mobile device such as a cell phone of the caregiver or the driver of the vehicle. A SIM is an integrated circuit chip that is intended to securely store the international mobile subscriber identity (IMSI) number and its related key, which are used to identify and authenticate subscribers on mobile telephony devices (such as mobile phones and computers). The pluggable cellular device may be a Bluetooth-enabled device with the on-board battery. It gets paired up with a caregiver or driver cell phone via a Bluetooth protocol and may be programmed to send a Short Message Service (SMS) to the reminder APP associated with the pluggable cellular device and installed on the caregiver or driver cell phone. The pluggable cellular device may include a plugging interface to plug into a vehicle standard power outlet/cigarette lighter port. Based on outputs of the voice sensor and the motion sensor which may indicate either motion or audio signal inside the vehicle and detecting that the vehicle ignition is turned off, the pluggable cellular device may transmit an alarm signal and/or a Short Message Service (SMS) to the reminder APP installed on the caregiver or driver cell phone over a cellular link so that the caregiver or driver cell phone emits a loud tone. Short Message Service (SMS) is a text messaging service component of phone, Web, or mobile communication systems.

In accordance with one illustrative embodiment of the present invention, a wireless in-vehicle reminder device comprises a housing including a plug to snugly insert into a socket or a port of a vehicle to connect to a power source of the vehicle. The wireless in-vehicle reminder device further comprises a first wireless transceiver configured to communicate on a first wireless link with a first wireless module of a handheld mobile device. The wireless in-vehicle reminder device further comprises a reminder mechanism configured to provide a reminder in a form of an alarm signal as at least one of an audio warning and a visual warning to the handheld mobile device over the first wireless link in response to a warning event detected in the vehicle.

Consistent with another embodiment, a method of reminding a driver who might forget that a child is in a vehicle. The method comprises providing a housing including a plug to snugly insert into a socket or a port of the vehicle to connect to a power source of the vehicle, providing a first wireless transceiver configured to communicate on a first wireless link with a first wireless module of a handheld mobile device and providing a reminder in a form of an alarm signal as at least one of an audio warning and a visual warning to the handheld mobile device over the first wireless link in response to a warning event detected in the vehicle.

According to yet another embodiment of the present invention, a wireless in-vehicle reminder device system is provided. The system comprises a wireless in-vehicle reminder device having a housing including a plug to snugly insert into a socket or a port of a vehicle to connect to a power source of the vehicle. The wireless in-vehicle reminder device includes a first wireless transceiver configured to communicate on a first wireless link with a first wireless module of a handheld mobile device and a reminder mechanism configured to provide a reminder in a form of an alarm signal to the handheld mobile device over the first wireless link in response to a warning event detected in the vehicle. The system further comprises a reminder application (APP) installed on the handheld mobile device and associated with the reminder mechanism to provide at least one of an audio warning and a visual warning from the handheld mobile device in response to the alarm signal.

DETAILED DESCRIPTION

Figure 1:
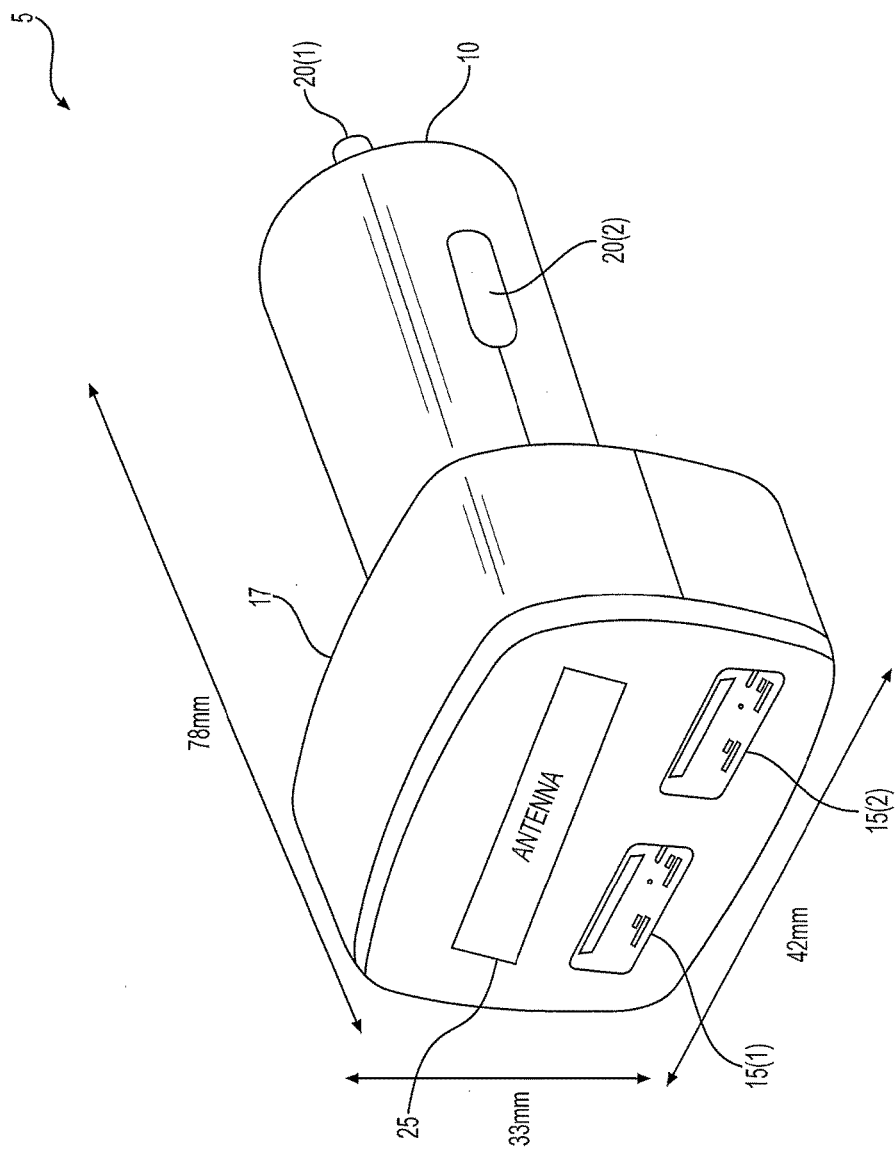
FIG. 1 illustrates a perspective view of a wireless in-vehicle reminder device that monitors and detects a handheld mobile device for sending an alarm signal to a reminder application (APP) installed on the handheld mobile device based on vehicle ignition off information, motion data and audio data in accordance with an exemplary embodiment of the present invention.

To facilitate an understanding of embodiments, principles, and features of the present invention, they are explained hereinafter with reference to implementation in illustrative embodiments. In particular, they are described in the context of a wireless in-vehicle reminder device that interfaces and communicates with a reminder application (APP) installed on a handheld mobile device over a cellular link to wirelessly provide audio and/or visual warnings to parents or caregivers about unknowingly leaving a child in a vehicle via a speaker and/or a display screen of the handheld mobile device based on vehicle ignition off information, motion data and audio data. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Embodiments of the present invention relate to a wireless in-vehicle reminder cellular system that protects children from dying from heat-related deaths after being trapped inside hot vehicles. Sometimes parents or caregivers can unknowingly leave a sleeping child behind in a vehicle and the end result can be injury or even death. For example, a parent may forget to drop a child off at a daycare. The wireless in-vehicle reminder cellular system includes a wireless in-vehicle reminder device configured to wirelessly communicate directly over a cellular link to a handheld mobile device itself and/or directly via a reminder application (APP) installed on the handheld mobile device such as via a server platform in that the reminder APP provides alarms as warning signals to the parents and caregivers based on vehicle ignition off information, motion data and audio data, informing them that parents or caregivers have unknowingly left a child behind in a car seat of their vehicle.

Although some embodiments of this invention may be described and illustrated herein in terms of a cellular link to for messaging, it should be understood that embodiments of this invention are not so limited, but are generally applicable to any wireless link such as Bluetooth, WiFi and other suitable short-range wireless or long-range wireless platforms etc. Further, although some embodiments of this invention may be described and illustrated herein in the context of an in-vehicle pluggable device, it should be understood that embodiments of this invention are not so limited, but are generally applicable to any device, such as a USB memory flash drive having a USB plug-port and some suitable wireless communication capabilities built-in to communicate directly with a handheld mobile device itself and/or directly via a reminder application (APP) installed on the handheld mobile device such as via a server platform, for example.

FIG. 1 illustrates a perspective view of a wireless in-vehicle reminder device 5 that monitors and detects a handheld mobile device for sending an alarm signal to a reminder application (APP) installed on the handheld mobile device based on vehicle ignition off information, motion data and audio data in accordance with an exemplary embodiment of the present invention. The wireless in-vehicle reminder device 5 includes a plug 10 to insert into a cigarette lighter socket of a vehicle. The wireless in-vehicle reminder device 5 may include one or more charging socket(s) 15(1-2) to receive a male connector of a device charging cable and provide charging capabilities when plugged-in. For example the charging socket 15 may be a USB socket configured to receive a USB male connector. The charging socket 15 may include a metal port for making an electrical connection. The charging socket 15 is configured to receive a connector of a charging cable to charge an electronic device battery.

One example of a size of the wireless in-vehicle reminder device 5 may be dimensions of 78 mm×42 mm×33 mm. The wireless in-vehicle reminder device 5 comprises a housing 17 made of plastic. The housing 17 comprises the plug 10 that may include one or more such as 3 connectors 20(1-3) may be made of metal such as steel (only two are visible in FIG. 1) to pair with metal connectors of the cigarette lighter socket of the vehicle. The two metal connectors 20(1-2) may be a linear spring-type and the third metal connector located at a distal end of the plug 10 may be a spring pin-type. The wireless in-vehicle reminder device 5 may include an antenna 25 to wirelessly communicate with the handheld mobile device over a cellular link. The wireless in-vehicle reminder device 5 may be configured to plug into a vehicle's on-board diagnostic port and wirelessly sync with the handheld mobile device.

Figure 2:
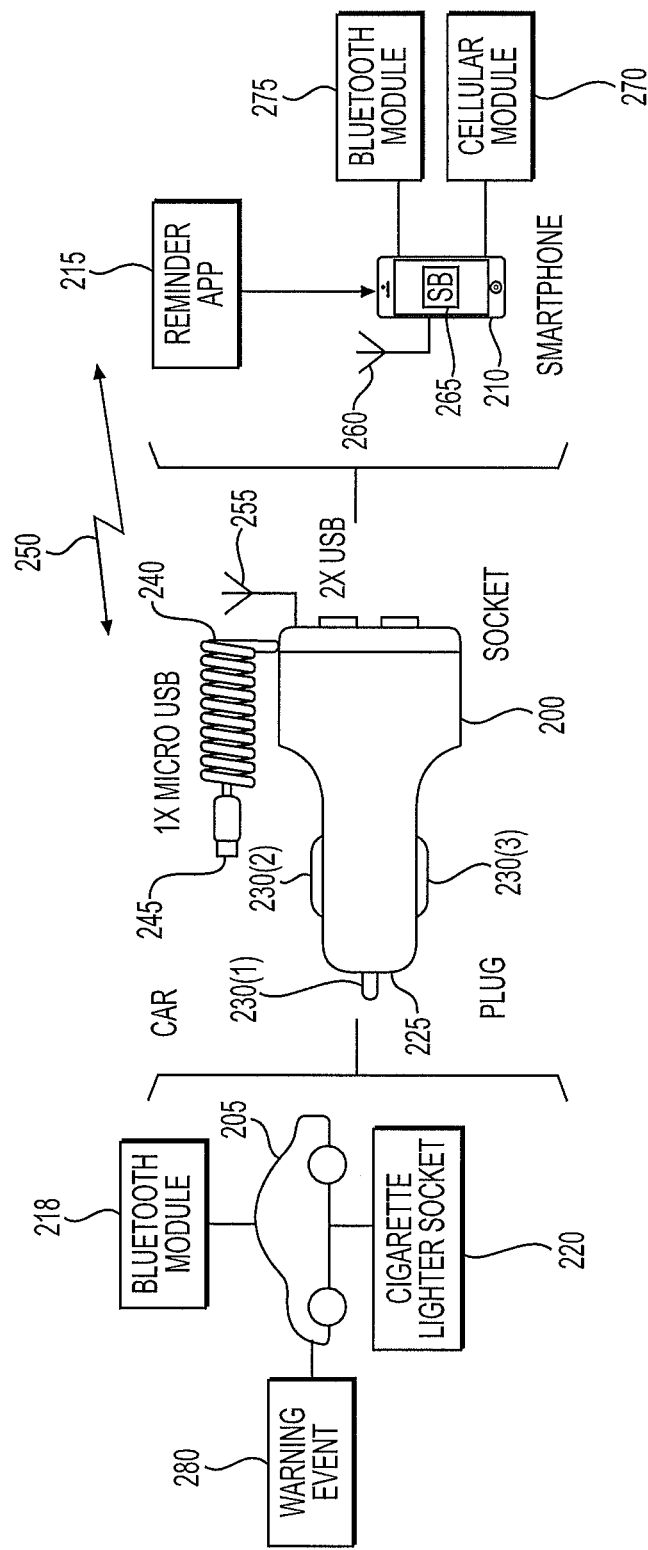
FIG. 2 illustrates a flow chart of an overview of the operation breakdown of the wireless in-vehicle reminder device of FIG. 1 with a vehicle and the handheld mobile device as illustrated by the reminder application (APP) according to one embodiment of the present invention.

Referring to FIG. 2, it illustrates a flow chart of an overview of the operation breakdown of a wireless in-vehicle reminder device 200 with a vehicle 205 and a handheld mobile device 210 such as a smartphone as illustrated by a reminder application (APP) 215 installed on it according to one embodiment of the present invention. The vehicle 205 may include a wireless transceiver such as a built-in Bluetooth module 218 to communicate with the handheld mobile device 210 and a Bluetooth module of the wireless in-vehicle reminder device 200. The vehicle 205 may include a cigarette lighter socket 220 of 12V output. The wireless in-vehicle reminder device 200 may include a plug 225 including three metal connectors 230(1-3), USB sockets 235(1-2), and a charging cable 240 with a micro USB connector 245. The 230(1) metal connector may be a 12V terminal to receive 12V output from the vehicle's 205 electrical system via the vehicle's 205 battery. The other two metal connectors 230(2-3) may be ground (GND) terminals.

The reminder application (APP) 215 installed on the handheld mobile device 210 is configured to wirelessly communicate with the wireless in-vehicle reminder device 200 over a cellular link 250 via an antenna 255 of the wireless in-vehicle reminder device 200 and an antenna 260 of the handheld mobile device 210. The handheld mobile device 210 includes a soft button 265 on a user interface of a display screen of the handheld mobile device 210. The soft button 265 may be provided as part of a user interface of the reminder application (APP) 215.

The wireless in-vehicle reminder device 200 may be configured to plug into a cigarette lighter socket of the vehicle 205 to connect to a power source such as a 12V vehicle battery of the vehicle 205 and wirelessly sync with the handheld mobile device 210. Alternatively, the wireless in-vehicle reminder device 200 may be configured to plug into a vehicle's on-board diagnostic port to connect to the power source of the vehicle 205 and wirelessly sync with the handheld mobile device 210 without use of a Bluetooth protocol.

The handheld mobile device 210 includes a first wireless module such as a cellular module 270 to communicate with a cellular module of the wireless in-vehicle reminder device 200 and a second wireless module such as a Bluetooth module 275 to communicate with a Bluetooth module of the wireless in-vehicle reminder device 200.

In the vehicle 205, a warning event 280 such as a child is left behind inside of a locked vehicle by the parent mistakenly may occur. The warning event 280 in the vehicle 205 may be detected by the wireless in-vehicle reminder device 200 to prevent children being left in the vehicle 205 by mistake by a child caregiver for stopping hot vehicle deaths of children due to heat strokes. The wireless in-vehicle reminder device 200 may use one or more sensors to detect the warning event 280. For example, data collected by the one or more sensors may be used to determine whether the warning event 280 has occurred. The warning event 280 may be detected in the vehicle 205 based on a detection of human activity inside the interior of the vehicle 205 such as human motion or human voice. For example, when a child is left locked in the vehicle 205 for an extend period of time in hot weather conditions, the child physical movements causing vibration and noise and talking or crying is considered the human activity which may be detected by the wireless in-vehicle reminder device 200 with one or more suitable sensors.

Figure 3:
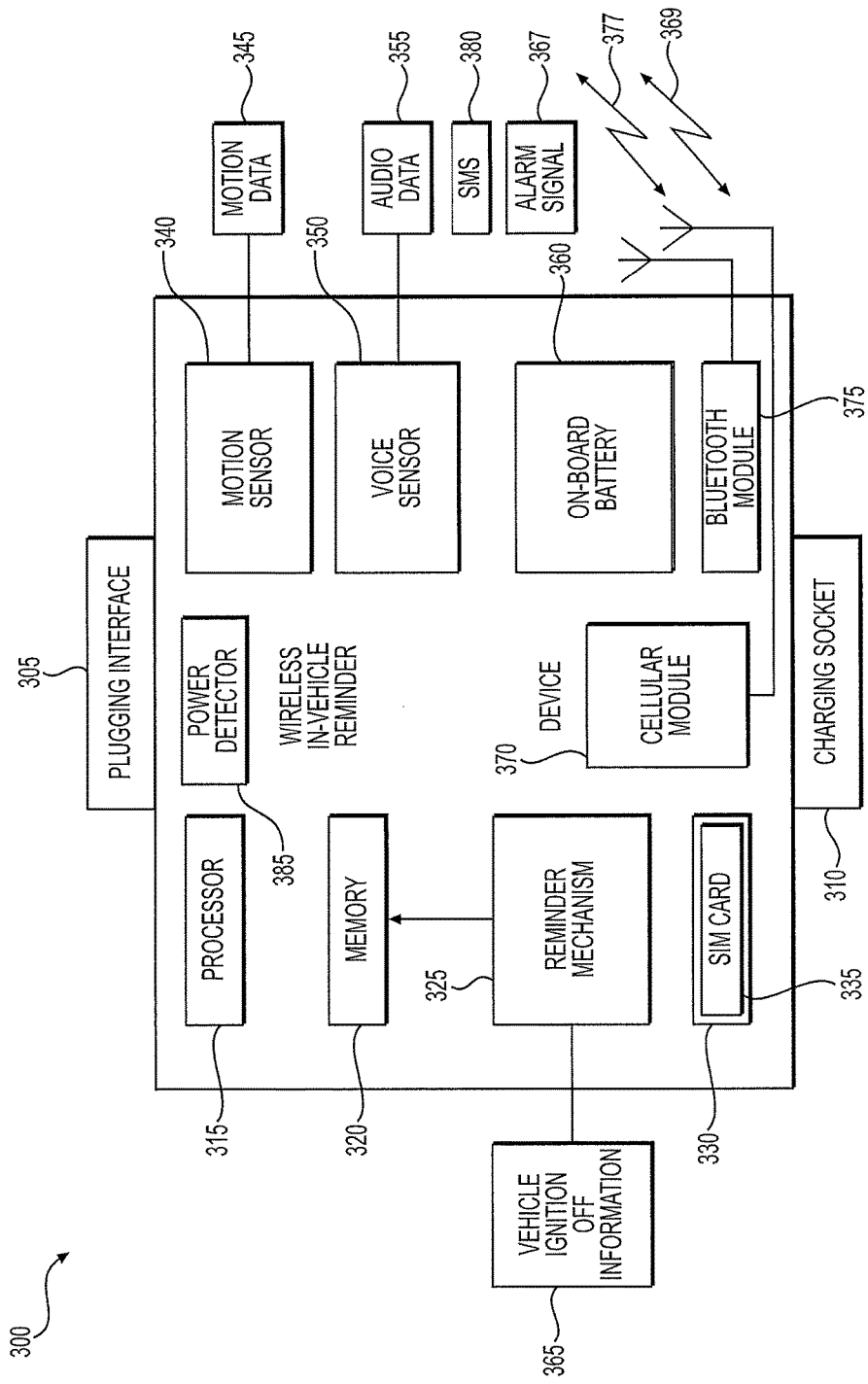
FIG. 3 illustrates a schematic of a block diagram of the wireless in-vehicle reminder device according to one embodiment of the present invention.

Turning now to FIG. 3, it illustrates a schematic of a block diagram of a wireless in-vehicle reminder device 300 according to one embodiment of the present invention. The wireless in-vehicle reminder device 300 includes a plugging interface 305 to insert into a socket in the vehicle. The wireless in-vehicle reminder device 300 further includes a charging socket 310 to receive a connector of a charging cable. The wireless in-vehicle reminder device 300 further includes a processor 315, a memory 320 to store a reminder mechanism 325.

The reminder mechanism 325 may be configured to remind drivers who might forget that a child is in the vehicle 205. The reminder mechanism 325 may provide a reminder in a form of an alarm as an audio and/or visual warning to the handheld mobile device 210 based on occurrence of a warning event in the vehicle 205 to prevent children being left in the vehicle 205 by mistake by a child caregiver for stopping hot vehicle deaths of children due to heat strokes. The reminder mechanism 325 may detect an occurrence of the warning event 280 such as a child is left behind inside of a locked vehicle by the parent mistakenly.

The wireless in-vehicle reminder device 300 further includes a SIM card socket 330 to receive a given SIM card 335. The SIM card 335 programmable to provide a dialing out feature to call a phone number of the handheld mobile device 210. The SIM card 335 may be activated and programmed by a parent as a mobile phone device having a mobile phone number capable of dialing to the handheld mobile device 210 and sending messaging such as an alarm signal or a SMS message indicative of occurrence of the warning event 280 such as a child is left behind inside of a locked vehicle by the parent mistakenly.

The wireless in-vehicle reminder device 300 further includes a motion sensor 340 that collects motion data 345 corresponding to any motion detected inside the interior of the vehicle by the motion sensor 340. For example, any motion disturbance caused by any activity such as by moving body or body parts of the child restrained in a vehicle car seat on a vehicle seat of the vehicle. The wireless in-vehicle reminder device 300 further includes a voice sensor 350 that collects audio data 355 corresponding to any sound detected inside the interior of the vehicle by the voice sensor 350. For example, any sound disturbance caused by any activity such as by talking or crying of the child restrained in a vehicle car seat on a vehicle seat of the vehicle.

The wireless in-vehicle reminder device 300 further includes an on-board battery 360 capable of getting charged when the vehicle ignition is turned on and the cigarette lighter socket is powered-up by the vehicle electrical system to provide a 12V output to a plugged-in device. The on-board battery 360 activates or powers-up the wireless in-vehicle reminder device 300 when the vehicle ignition is turned off. In this battery power mode, the motion sensor 340 is operated to collect the motion data 345 for the processor 315 and the voice sensor 350 is operated to collect the audio data 355 for the processor 315. The motion sensor 340 and the voice sensor 350 may be implemented in hardware or software or a combination of these two. The voice sensor 350 may include a very high sensitivity microphone. Motion sensors are a well-known device.

The reminder mechanism 325 senses and collects vehicle ignition OFF information 365 and uses the collected motion data 345 and the collected audio data 355 to determine whether to send an alarm signal 367 to the handheld mobile device 210 and/or the reminder APP 215 over a cellular link 369. The alarm signal 367 may be a SMS message sent by the reminder mechanism 325 to the handheld mobile device 210. In the battery power mode, the reminder mechanism 325 senses and collects the vehicle ignition OFF information 365. The motion data 345, the audio data 355 and the vehicle ignition OFF information 365 may be stored and maintained for access by the reminder mechanism in the memory 320.

The wireless in-vehicle reminder device 200 may use the motion sensor 340 and/or the voice sensor 350 to detect the warning event 280. For example, the motion data 345 and the audio data 355 may be used to determine whether the warning event 280 has occurred.

The warning event 280 such as a child is left behind inside of a locked vehicle by the parent mistakenly may prompt the reminder mechanism 325 to send the alarm signal 367. The warning event 280 is based on an outcome derived of the motion data 345, the audio data 355 and the vehicle ignition OFF information 365. If the vehicle is turned OFF and there is a presence of any discernible or detectable motion data 345 and audio data 355 above a predetermined threshold then the reminder mechanism 325 sends out the alarm signal 367 to the handheld mobile device 210 and/or the reminder APP 215.

The wireless in-vehicle reminder device 300 further includes a first wireless transceiver such as a cellular module 370 to communicate on a first wireless link based on a first wireless protocol (e.g., cellular protocol) such as the cellular link 369 with the handheld mobile device 210 and/or the reminder APP 215. The wireless in-vehicle reminder device 300 further includes a second wireless transceiver such as a Bluetooth module 375 to communicate on a second wireless link based on a second wireless protocol (e.g., Bluetooth protocol) such as a Bluetooth link 377 with a Bluetooth module of the handheld mobile device 210 and/or the reminder APP 215 and/or on a third wireless link based on the second wireless protocol (e.g., Bluetooth protocol) such as a Bluetooth link with the built-in Bluetooth module 218 of the vehicle 205.

In one embodiment, the wireless in-vehicle reminder device 300 does not comprise the housing 17 including the plug 10 to snugly insert into a socket or a port of the vehicle to connect to a power source of the vehicle. Rather, the wireless in-vehicle reminder device 300 is integrated within the vehicle 205 as it is built-in into it. In this case, the built-in wireless in-vehicle reminder device 300 comprises the first wireless transceiver such as the cellular module 370 configured to communicate on a first wireless link such as the cellular link 369 with a first wireless module such as the cellular module of the handheld mobile device 210. The built-in wireless in-vehicle reminder device 300 further comprises the reminder mechanism 325 configured to provide a reminder in a form of the alarm signal 367 to the handheld mobile device 210 over the first wireless link in response to the warning event 280 detected in the vehicle 205. The reminder application (APP) 215 may be installed on the handheld mobile device 210 and associated with the reminder mechanism 325 to provide at least one of an audio warning and a visual warning from the handheld mobile device 210 in response to the alarm signal 367. The built-in wireless in-vehicle reminder device 300 may comprise the other components of a modular, portable or non-built-in wireless in-vehicle reminder device 300 as shown such as the on-board battery 360 etc.

The vehicle ignition OFF information 365 may be obtained by the reminder mechanism 325 using the Bluetooth module 375. The reminder mechanism 325 may check if the Bluetooth module 375 is paired with a built-in Bluetooth module of the vehicle 205. If the vehicle ignition is turned ON the built-in Bluetooth module of the vehicle 205 would be paired with the Bluetooth module 375 of the wireless in-vehicle reminder device 300 and the reminder mechanism 325 will derive that the vehicle ignition is turned ON. While the vehicle ignition will be turned OFF, the built-in Bluetooth module of the vehicle 205 would not be paired with the Bluetooth module 375 of the wireless in-vehicle reminder device 300, indicating the status of the vehicle 205 being turned OFF.

The wireless in-vehicle reminder device 300 may be a Bluetooth-enabled device with the on-board battery 360 and it gets paired up with the handheld mobile device 210 via Bluetooth and programmed to send a SMS message 380 to the reminder APP 215 associated with wireless in-vehicle reminder device 300 and installed on the handheld mobile device 210. The Bluetooth module 375 then searches for the handheld mobile device 210 continuously every 10 minutes over the Bluetooth link 377 whenever the vehicle ignition is switched OFF. If the Bluetooth module 375 makes a connection, meaning that the handheld mobile device 210 is in the vehicle and paired, it does not do anything. If the Bluetooth module 375 can't find the handheld mobile device 210 in the 10 minute window intervals within a range of a Bluetooth signal of the Bluetooth module 375 (e.g., unable to pair) but outputs of the voice sensor 350 and the motion sensor 340 indicate either motion or audio signal inside the vehicle 205, however, it will transmit the alarm signal 367 and/or the SMS message 380 to the reminder APP 215 installed on the handheld mobile device 210 over the cellular link 369 so that the handheld mobile device 210 emits a loud tone that pretty much says, "Check, did you forgot your child's car seat" and does not stop until the parent or the caregiver press the soft button 265 on the screen of the handheld mobile device 210 and/or displays a visual warning message on the reminder APP 215 installed on the handheld mobile device 210.

Alternatively, the wireless in-vehicle reminder device 300 may include a power detector 385 to sense if a power input signal to the wireless in-vehicle reminder device 300 is turned OFF by way of turning the ignition of the vehicle 205 OFF. The reminder mechanism 325 may collect the vehicle ignition OFF information 365 from the power detector 385. The power detector 385 may be implemented in hardware or software or a combination of these two.

If the Bluetooth module 375 can't find the handheld mobile device 210 in a predefined-minutes window intervals within a range of a Bluetooth signal of the Bluetooth module 375 (e.g., unable to pair), the Bluetooth module 375 provides a signal to the reminder mechanism 325 indicative of this status that the vehicle ignition is turned OFF which issues a wake-up signal to the wireless in-vehicle reminder device 300. Likewise, the power detector 385 provides a signal to the reminder mechanism 325 indicative of this status that the vehicle ignition is turned OFF which issues the wake-up signal to the wireless in-vehicle reminder device 300. Upon a wake-up, the wireless in-vehicle reminder device 300 starts scanning for motion disturbance or audio disturbance via the motion sensor 340 and the voice sensor 350. And the reminder mechanism 325 starts collecting the motion data 345 and the audio data 355 and starts analysing the motion data 345 and the audio data 355 by comparing them to a respective predetermined threshold.

Figure 4:
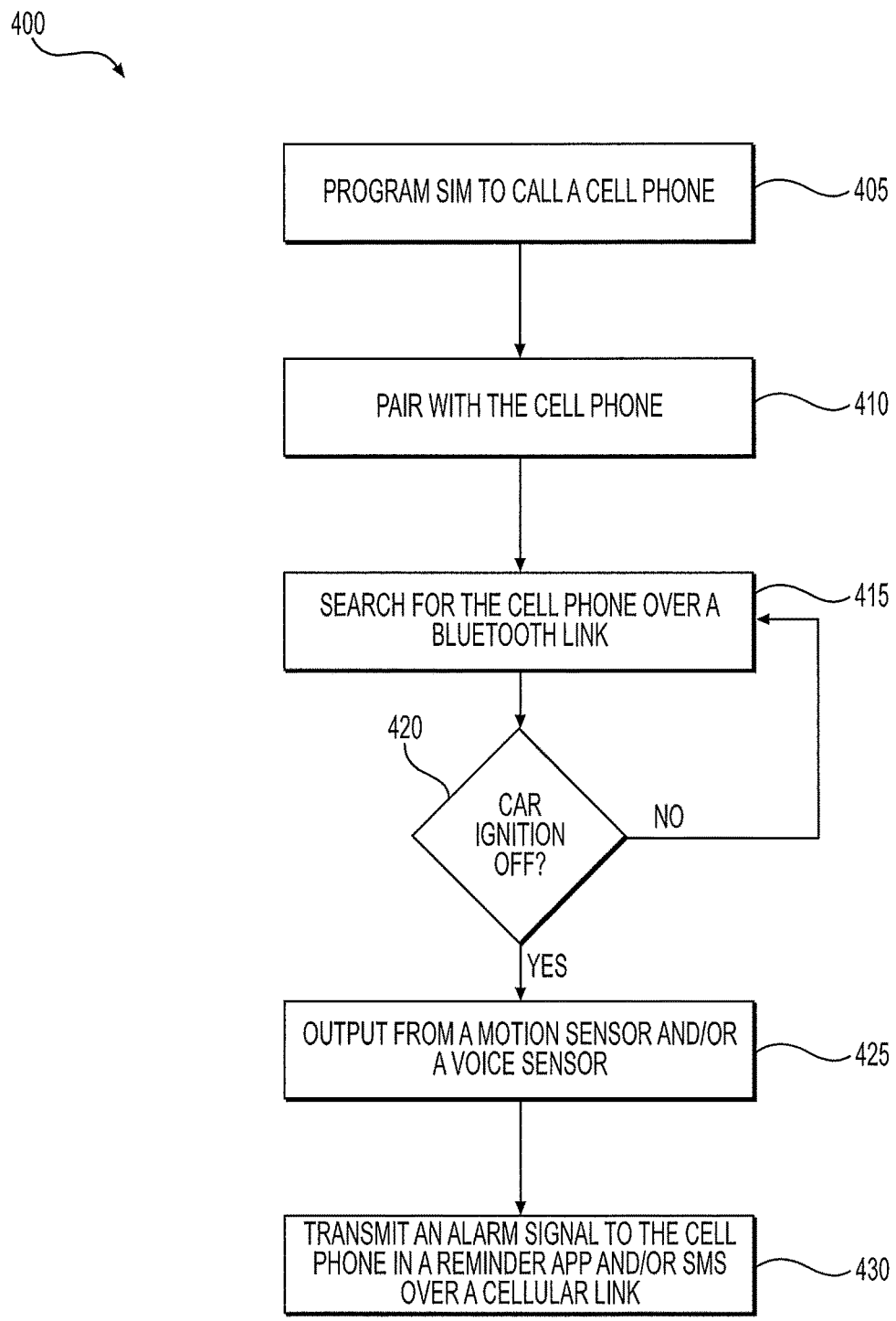
FIG. 4 illustrates a flow chart of a method in which the wireless in-vehicle reminder device interfaces with the handheld mobile device of FIG. 2 using the reminder mechanism of FIG. 3 according to one embodiment of the present invention.

FIG. 4 illustrates a flow chart of a method 400 in which the wireless in-vehicle reminder device 300 interfaces with the handheld mobile device 210 of FIG. 2 using the reminder mechanism 325 of FIG. 3 according to one embodiment of the present invention. Reference is made to the elements and features described in FIGS. 1-3. It should be appreciated that some steps are not required to be performed in any particular order, and that some steps are optional.

In step 405, the method 400 includes activating and/or programming the SIM card 335 of the wireless in-vehicle reminder device 300 to automatically and periodically call the handheld mobile device 210 when instructed by the reminder mechanism 325 to issue a warning to the reminder APP 215 or transmit the SMS to the handheld mobile device 210 using the alarm signal 367. A mobile cell phone number of the handheld mobile device 210 such as (203) 798-8901 may be programmed, associated and/or stored into the SIM card 335 of the wireless in-vehicle reminder device 300 to continuously dial it whenever a warning event is detected in the vehicle 205 by the reminder mechanism 325. For example, a warning event may occur based on the motion data 345 and/or the audio data 355 going beyond, e.g., a predefined threshold in terms of dB levels, and a vehicle ON/OFF status from the vehicle ignition OFF information 365.

In step 410, the method 400 includes once pairing the Bluetooth module 375 of the wireless in-vehicle reminder device 300 with a built-in Bluetooth module of the handheld mobile device 210. This pairing may be done automatically when the handheld mobile device 210 comes in a Bluetooth signal range of the Bluetooth module 375 of the wireless in-vehicle reminder device 300. For example, subsequent pairings after the first pairing may seamlessly happen whenever the caregiver or the parent enters the vehicle 205 with the handheld mobile device 210 for driving it with a child restrained in a child car seat in a rear passenger seat. The reminder mechanism 325, in step 415, may wirelessly search for the handheld mobile device 210 over the Bluetooth link 377 to detect it and make a note if detected/paired that the caregiver or the parent is driving the vehicle 205 with a child restrained in a child car seat in a rear passenger seat.

In a decision step 420, the method 400 includes that the reminder mechanism 325 makes a check whether the vehicle ignition is turned OFF as described previously. If it is determined that the vehicle ignition is not turned OFF based on the vehicle ignition OFF information 365, the reminder mechanism 325 continues to search for the handheld mobile device 210 over the Bluetooth link 377 to ensure that the vehicle 205 is running and the handheld mobile device 210 of the caregiver or the parent has not left the vehicle 205 surroundings since the Bluetooth module 375 is still paired with the built-in Bluetooth module of the handheld mobile device 210. Because when the ignition of the vehicle 205 is turned OFF, the built-in Bluetooth module of the vehicle 205 will get turned OFF and the vehicle 205 will not be any more paired with the handheld mobile device 210, indicating that the vehicle ignition is turned OFF. If the check at step 420 determines that the vehicle ignition is turned OFF, the reminder mechanism 325 examines the status of the motion data 345 and the audio data 355 at step 425. When a level of the motion data 345 and/or the audio data 355 is detected over a pre-set threshold, in step 430, the reminder mechanism 325 transmits the alarm signal 367 to the handheld mobile device 210 in the reminder APP 215 and/or sends the SMS 380 over the cellular link 350.

Figure 5:
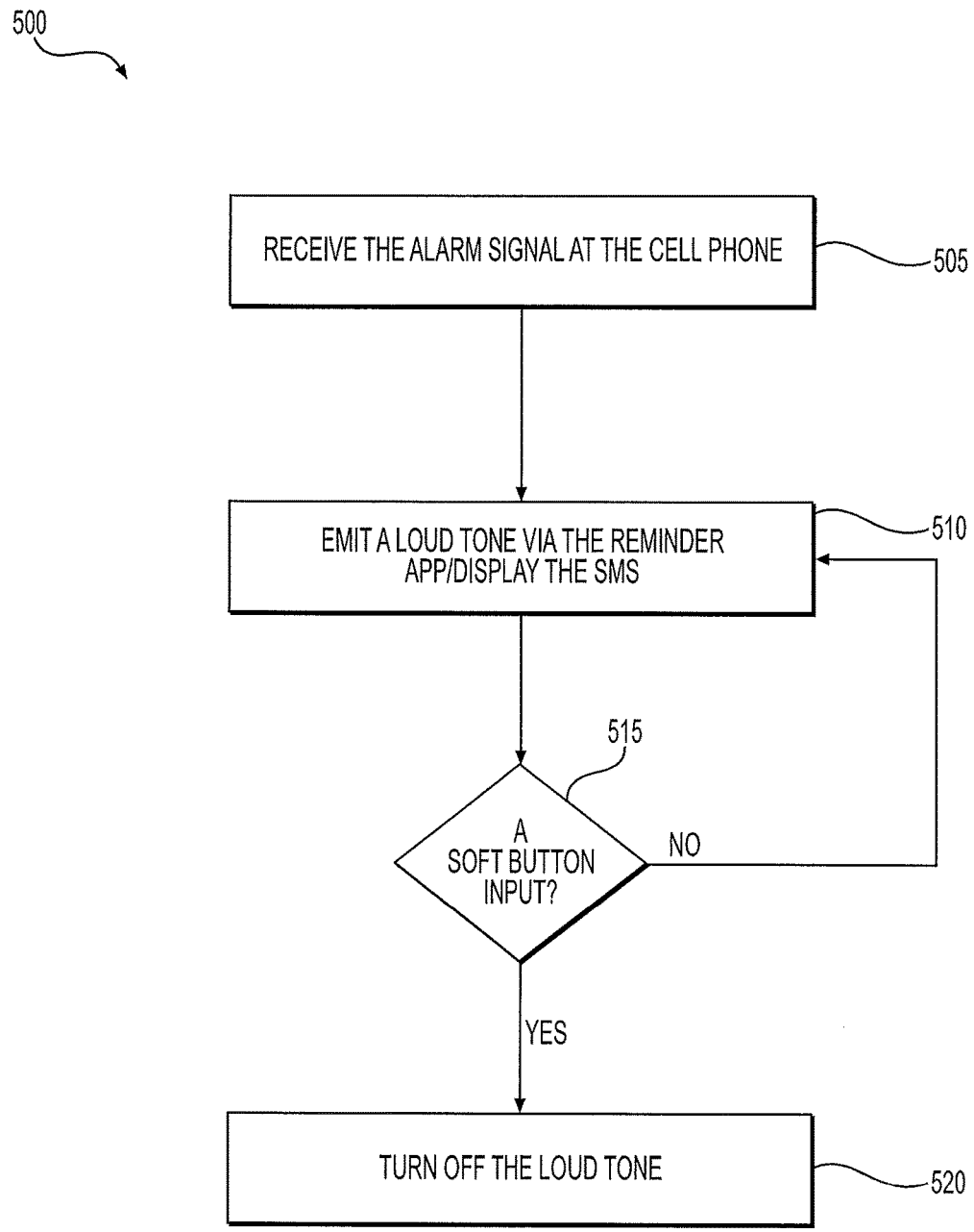
FIG. 5 illustrates a flow chart of a method in which the handheld mobile device of FIG. 2 may receive an alarm signal from the reminder mechanism of the wireless in-vehicle reminder device and play a loud tone as a warning to a caregiver or a driver of the vehicle having the handheld mobile device according to one embodiment of the invention.

As seen in FIG. 5, it illustrates a flow chart of a method 500 in which the handheld mobile device 210 of FIG. 2 may receive the alarm signal 367 from the reminder mechanism 325 of the wireless in-vehicle reminder device 300 and play a loud tone as a warning to a caregiver or a driver of the vehicle 205 having the handheld mobile device 210 according to one embodiment of the invention. Reference, is made to the elements and features described in FIGS. 1-3. It should be appreciated that some steps are not required to be performed in any particular order, and that some steps are optional.

In step 505, the handheld mobile device 210 may receive the alarm signal 367 from the reminder mechanism 325 of the wireless in-vehicle reminder device 300. In step 510, the handheld mobile device 210 may emit a loud tone via the reminder APP 215 and/or display the SMS 380 or a visual message on the display screen of the handheld mobile device 210. A decision step 515 may check if the soft button 265 is pressed by a user on the display screen of the handheld mobile device 210. If not pressed, the reminder APP 215 and/or the handheld mobile device 210 continue to play the loud tone. Upon detecting pressing of the soft button 265, in step 520, the reminder APP 215 and/or the handheld mobile device 210 turns OFF playing of the loud tone through a speaker of the handheld mobile device 210.

The handheld mobile device 210 may be any of a variety of types such as those illustrated in FIG. 2, for example, a PDA or a mobile telephone or a tablet that may provide a reminder mechanism according to an embodiment of the invention. Additionally, the handheld mobile device 210 may be a combination of these types. For example, in one embodiment the handheld mobile device 210 may be a device that is a combination of PDA and a mobile telephone.

The techniques described herein can be particularly useful for using a short-range wireless, e.g., Bluetooth and/or WiFi-based WLAN system. While particular embodiments are described in terms of Bluetooth and/or WiFi, the techniques described herein are not limited to Bluetooth and/or WiFi but can also use other software and hardware such as NFC or other smart automotive interactive communication modules.

For example, the vehicle 205 may be equipped with an Onboard Unit (OBU) which may completely or partially implement the short-range wireless, e.g., Bluetooth and/or WiFi-based WLAN system. As used herein, "a vehicle V equipped with an Onboard Unit (OBU)" refers to a vehicle that connects to sensors, decision-making systems and control systems for enabling a safety system for connected and unconnected vehicles. The "short-range wireless, e.g., Bluetooth and/or WiFi-based WLAN system," in addition to the exemplary hardware description above, refers to a system that is configured to provide communications for creating an ecosystem of a connected vehicle, operated by a controller. The short-range wireless, e.g., Bluetooth and/or WiFi-based WLAN system can include multiple interacting systems, whether located together or apart, that together perform processes as described herein.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A wireless in-vehicle reminder device comprising:
a housing including a plug to snugly insert into a socket or a port of a vehicle to connect to a power source of the vehicle;
a first wireless transceiver configured to communicate on a first wireless link with a first wireless module of a handheld mobile device;
a reminder mechanism configured to provide a reminder in a form of an alarm signal as at least one of an audio warning and a visual warning to the handheld mobile device over the first wireless link in response to a warning event detected in the vehicle;
a motion sensor configured to detect whether there is motion inside the vehicle beyond a predetermined threshold level and collect motion data for the reminder mechanism to provide the alarm signal;
a voice sensor configured to detect whether there is audio inside the vehicle beyond a predetermined threshold level and collect audio data for the reminder mechanism to provide the alarm signal; and
a wireless module to detect vehicle ignition OFF information for the reminder mechanism to provide the alarm signal based on the motion data, the audio data and the vehicle ignition OFF information.

2. The wireless in-vehicle reminder device of claim 1, further comprising:
a second wireless transceiver configured to communicate on a second wireless link a second wireless module of the handheld mobile device, wherein the second wireless transceiver is different than the first wireless transceiver.

3. The wireless in-vehicle reminder device of claim 1, further comprising:
a power detector to detect vehicle ignition OFF information for the reminder mechanism to provide the alarm signal based on the motion data, the audio data and the vehicle ignition OFF information.

4. The wireless in-vehicle reminder device of claim 1, further comprising:
a SIM card socket to receive a SIM card, the SIM card programmable to provide a dialing out feature to call a phone number of the handheld mobile device.

5. The wireless in-vehicle reminder device of claim 4, further comprising:
an on-board battery to charge from the power source of the vehicle and power-up the wireless in-vehicle reminder device when the vehicle ignition is turned OFF.

6. The wireless in-vehicle reminder device of claim 5, further comprising:
a charging socket configured to receive a connector of a charging cable to charge an electronic device battery.

7. The wireless in-vehicle reminder device of claim 1, wherein the alarm signal sent by the reminder mechanism to a reminder application (APP) installed on the handheld mobile device and associated with the reminder mechanism.

8. The wireless in-vehicle reminder device of claim 1, wherein the alarm signal is a SMS message to be sent by the reminder mechanism to the handheld mobile device.

9. The wireless in-vehicle reminder device of claim 1, wherein the alarm signal causes a reminder application (APP) installed on the handheld mobile device and associated with the reminder mechanism to play a loud tone from a speaker of the handheld mobile device.

10. A wireless in-vehicle reminder device system comprising:
a wireless in-vehicle reminder device including:
a first wireless transceiver configured to communicate on a first wireless link with a first wireless module of a handheld mobile device, and
a reminder mechanism configured to provide a reminder in a form of an alarm signal to the handheld mobile device over the first wireless link in response to a warning event detected in a vehicle based on an indication of human activity inside the vehicle;
a housing including a plug to snugly insert into a socket or a port of the vehicle to connect to a power source of the vehicle;
a second wireless transceiver configured to communicate on a second wireless link a second wireless module of the handheld mobile device, wherein the second wireless transceiver is different than the first wireless transceiver;
a motion sensor configured to detect whether there is motion inside the vehicle beyond a predetermined threshold level and collect motion data for the reminder mechanism;
a voice sensor configured to detect whether there is audio inside the vehicle beyond a predetermined threshold level and collect audio data for the reminder mechanism;
a wireless module or a power detector to detect vehicle ignition OFF information for the reminder mechanism to provide the alarm signal based on at least the motion data, the audio data and the vehicle ignition OFF information; and
a reminder application (APP) installed on the handheld mobile device and associated with the reminder mechanism to provide at least one of an audio warning and a visual warning from the handheld mobile device in response to the alarm signal.

\* \* \* \* \*